(12) United States Patent
Schultz et al.

(10) Patent No.: US 11,661,123 B2
(45) Date of Patent: May 30, 2023

(54) SHOCK ABSORBING PIN BOX SYSTEM

(71) Applicant: Lippert Components, Inc., Elkhart, IN (US)

(72) Inventors: Timothy D. Schultz, Mishawaka, IN (US); Brandon Burdine, Elkhart, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 0 days.

(21) Appl. No.: 17/881,877

(22) Filed: Aug. 5, 2022

(65) Prior Publication Data

US 2022/0371387 A1 Nov. 24, 2022

Related U.S. Application Data

(63) Continuation of application No. 16/916,785, filed on Jun. 30, 2020, now Pat. No. 11,407,457.

(60) Provisional application No. 62/869,611, filed on Jul. 2, 2019.

(51) Int. Cl.
*B62D 53/08* (2006.01)
*B60D 1/24* (2006.01)
*B60D 1/50* (2006.01)
*B60D 1/01* (2006.01)

(52) U.S. Cl.
CPC ......... *B62D 53/0807* (2013.01); *B60D 1/015* (2013.01); *B60D 1/249* (2013.01); *B60D 1/50* (2013.01); *B62D 53/0842* (2013.01); *B62D 53/0885* (2013.01)

(58) Field of Classification Search
CPC ............ B62D 53/0807; B62D 53/0842; B62D 53/0885; B60D 1/50; B60D 1/249
See application file for complete search history.

(56) References Cited

U.S. PATENT DOCUMENTS

| 2,513,932 | A | | 7/1950 | Grube | |
|---|---|---|---|---|---|
| 3,169,783 | A | | 2/1965 | Harbers et al. | |
| 6,135,469 | A | * | 10/2000 | Hulstein | B60G 7/02 |
| | | | | | 280/124.13 |
| 6,986,524 | B2 | * | 1/2006 | Heitzmann | B60D 1/241 |
| | | | | | 280/439 |
| 7,703,792 | B1 | * | 4/2010 | Heitzmann | B62D 53/061 |
| | | | | | 280/455.1 |
| 8,100,427 | B2 | | 1/2012 | Mater, Jr. | |
| 9,441,696 | B2 | | 9/2016 | McCurter | |
| 9,944,137 | B2 | * | 4/2018 | Curl | B62D 53/0871 |

(Continued)

FOREIGN PATENT DOCUMENTS

WO WO 2018/217848 11/2018

*Primary Examiner* — Minnah L Seoh
*Assistant Examiner* — Hosam Shabara
(74) *Attorney, Agent, or Firm* — Nixon & Vanderhye P.C.

(57) ABSTRACT

A shock absorbing pin box system includes a first sidewall, a second sidewall, and an upper wall. The first sidewall defines at least a first plurality of apertures arranged in first column, and the second sidewall defines at least a second plurality of apertures arranged in a second column. A plurality of tubes extend from each of the first plurality of apertures and the second plurality of apertures. A plurality of flexible and resilient tubular bushings are received in a corresponding one of the plurality of tubes. A plurality of bolts are received within corresponding ones of the pluralities of apertures of the pin box and the plurality of tubes.

17 Claims, 15 Drawing Sheets

(56) References Cited

U.S. PATENT DOCUMENTS

| | | |
|---|---|---|
| 9,981,513 B2 | 5/2018 | Belinky et al. |
| 11,034,199 B2 * | 6/2021 | Miller ..................... B60D 1/14 |
| 11,084,343 B2 | 8/2021 | Curl |
| 11,407,457 B2 * | 8/2022 | Schultz ................. B60D 1/015 |
| 2004/0262883 A1 | 12/2004 | Kerins et al. |
| 2007/0262561 A1 | 11/2007 | Rehme |
| 2016/0107708 A1 | 4/2016 | Fiwek |
| 2018/0345743 A1 | 12/2018 | Pulliam et al. |

\* cited by examiner

SHOCK ABSORBING PIN BOX SYSTEM

CROSS-REFERENCES TO RELATED APPLICATIONS

This application is a continuation of U.S. patent application Ser. No. 16/916,785, filed Jun. 30, 2020, which claims the benefit of U.S. Provisional Patent Application No. 62/869,611, filed Jul. 2, 2019, the entire contents of each of which are hereby incorporated by reference in this application.

STATEMENT REGARDING FEDERALLY SPONSORED RESEARCH OR DEVELOPMENT (NOT APPLICABLE)

BACKGROUND AND SUMMARY

A fifth wheel pin box is a structure that is attached to the frame of a towed vehicle and that is selectively connectable to a hitch located on a towing vehicle. Some pin boxes are rigid structures that transfer load between the towed vehicle and the towing vehicle without any shock absorption or damping. Other pin boxes may include means for shock absorption and/or damping. Typically, such shock absorption and/or damping means absorb and/or dampen shock occurring in a longitudinal direction (sometimes referred to as "chucking"), as may result from the towing vehicle accelerating or decelerating, or in a vertical direction (sometimes referred to as "bounce"), as may result from the towed and or towing vehicle encountering road surface irregularities. Some pin boxes include a first means for absorbing and/or damping chucking and a second and separate means for absorbing and/or damping bounce.

The present disclosure is directed to a pin box system configured to absorb and/or dampen shock in more than one direction.

BRIEF DESCRIPTION OF THE DRAWINGS

These and other aspects and advantages will be described in detail with reference to the accompanying drawings, in which:

FIG. 13b is a detail perspective forward top view of the pin box frame of FIG. 13a;

FIG. 13c is a detail perspective rear top view of the pin box frame of FIG. 13a;

FIG. 13d is a left side cross-sectional perspective rear view of the pin box frame of FIG. 13a;

FIG. 13e is a right side perspective view of the kingpin of pin box frame FIG. 13a;

DETAILED DESCRIPTION

Figure 1:
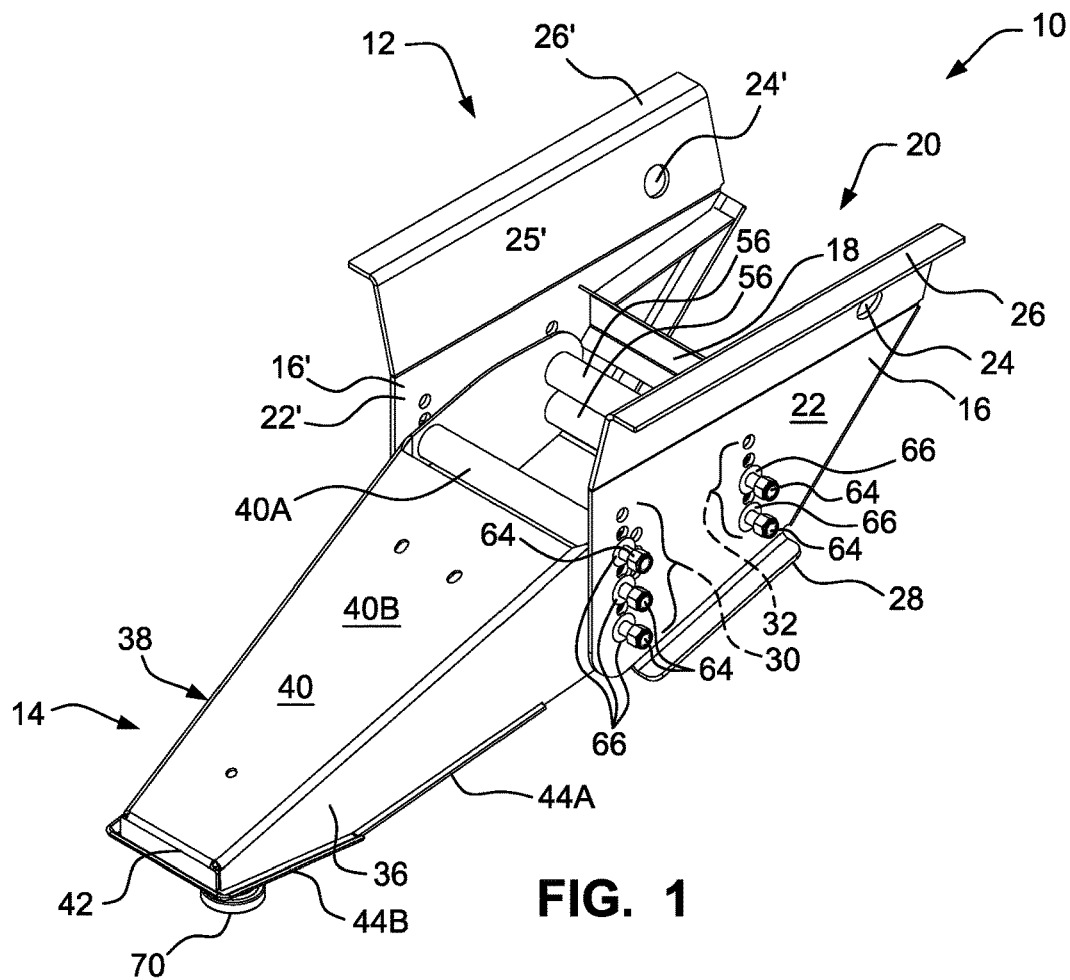
FIG. 1 is a perspective view of a shock absorbing pin box according to the present disclosure.
Figure 2:
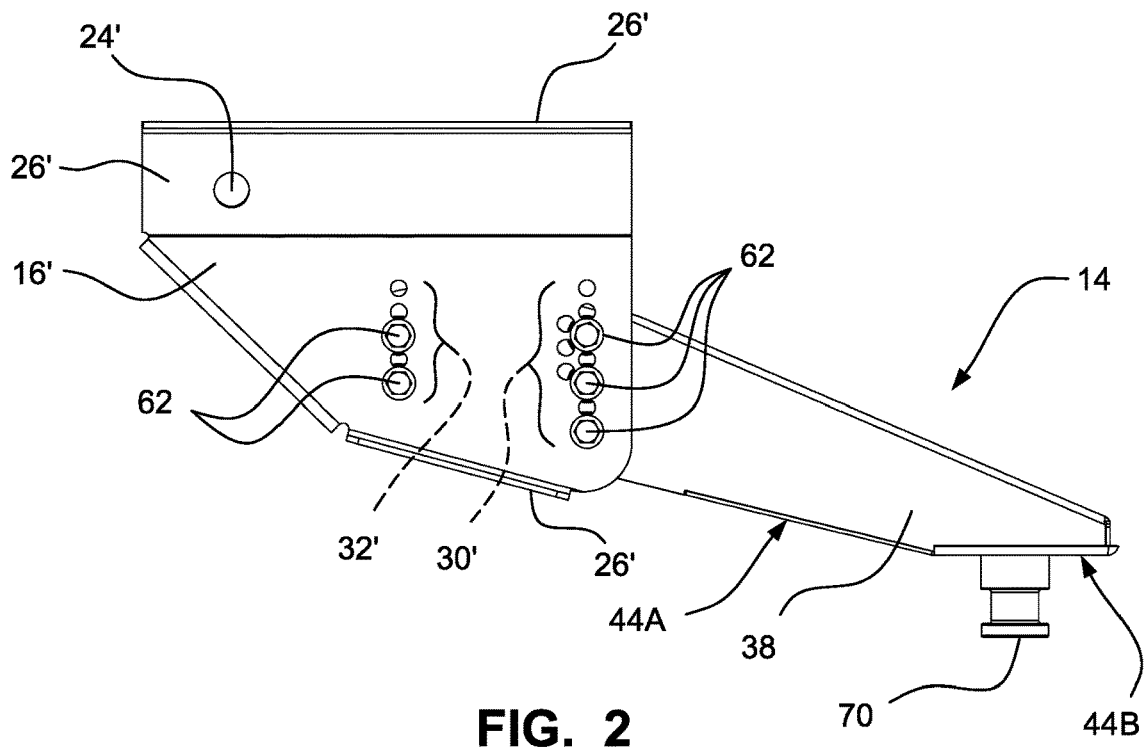
FIG. 2 is a right side elevation view of the shock absorbing pin box of FIG. 1.

Terms of orientation, for example, forward, rearward, front, rear, upper, lower, top, bottom, left, right, and the like, as may be used herein should be construed in a relative, rather than absolute, sense, unless context clearly dictates otherwise.

The drawings show an illustrative embodiment of a shock absorbing pin box system 10 according to the present disclosure. The pin box system 10 includes a mounting bracket 12 and a pin box 14 flexibly and resiliently connected to the mounting bracket. The mounting bracket 12 is configured for connection to a frame of a towed vehicle. The pin box 14 is configured for selective connection to a fifth wheel hitch installed on a tow vehicle.

As seen in FIGS. 1-4, the mounting bracket 12 includes a first wing plate 16, second wing plate 16', and a cross member 18 connecting the first wing plate to the second wing plate. So connected, the first wing plate 16 and the second wing plate 16' cooperate to define an interior space 20. Each wing plate has a planar surface 22, 22' that extends parallel and adjacent to the sides of the rear portion of the pin box 14. Apertures 24, 24' on the planar surface receive bolts to mount with the pin box 14, as will be described in more detail below. In other embodiments, cross member 18 could be eliminated and first and second wing plates 16, 16' could be independently attached to the pin box 14. The wing plates 16, 16' have flanges 26, 26' at their top and bottom ends that extend generally perpendicularly from the planar surface 22, 22'. The flanges 26, 26' are used to facilitate mounting of the pin box 14 within the frame of the towed vehicle. The mounting bracket may also include outwardly flared plates 25, 25' that connect the planar surface 22, 22' with the flanges 26, 26' for distributing stress on the frame when the pin box is mounted and in use.

The frame of the pin box 14 includes a first (or left) side wall 36, a second (or right) side wall 38, an upper wall 40, a front wall 42, and a lower wall 44. This is best illustrated in FIGS. 8-12 and 13a-13e. Each of the first and second side walls 36, 38 has a leading edge, a trailing edge, an upper edge, and a lower edge. Each of the upper wall 40 and the lower wall 44 has a leading edge, a trailing edge, a first side edge, and a second side edge. The front wall 42 has an upper edge, a lower edge, a first side edge, and a second side edge.

The first side wall 36 is connected to the second side wall 38 by the upper wall 40, the front wall 42, and the lower wall 44. More specifically, the upper edge of the first side wall 36 is connected to the first side edge of the upper wall 40, the lower edge of the first side wall is connected to the first side edge of the lower wall 44, and the leading edge of the first side wall is connected to the first side edge of the front wall 42. The upper edge of the second side wall 38 is connected to the second side edge of the upper wall 40, the lower edge of the second side wall is connected to the second side edge of the lower wall 44, and the leading edge of the second side wall is connected to the second side edge of the front wall 42. The leading edge of the upper wall 40 is connected to the upper edge of the front wall 42. The foregoing connections may be welded connections.

Figure 3:
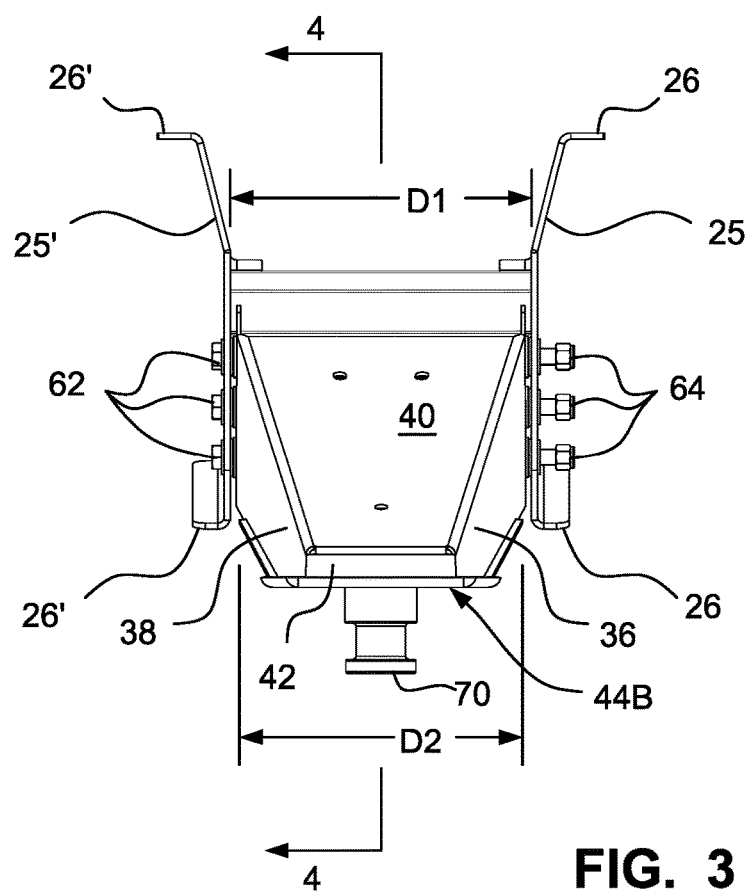
FIG. 3 is a front elevation view of the shock absorbing pin box of FIG. 1.
Figure 4:
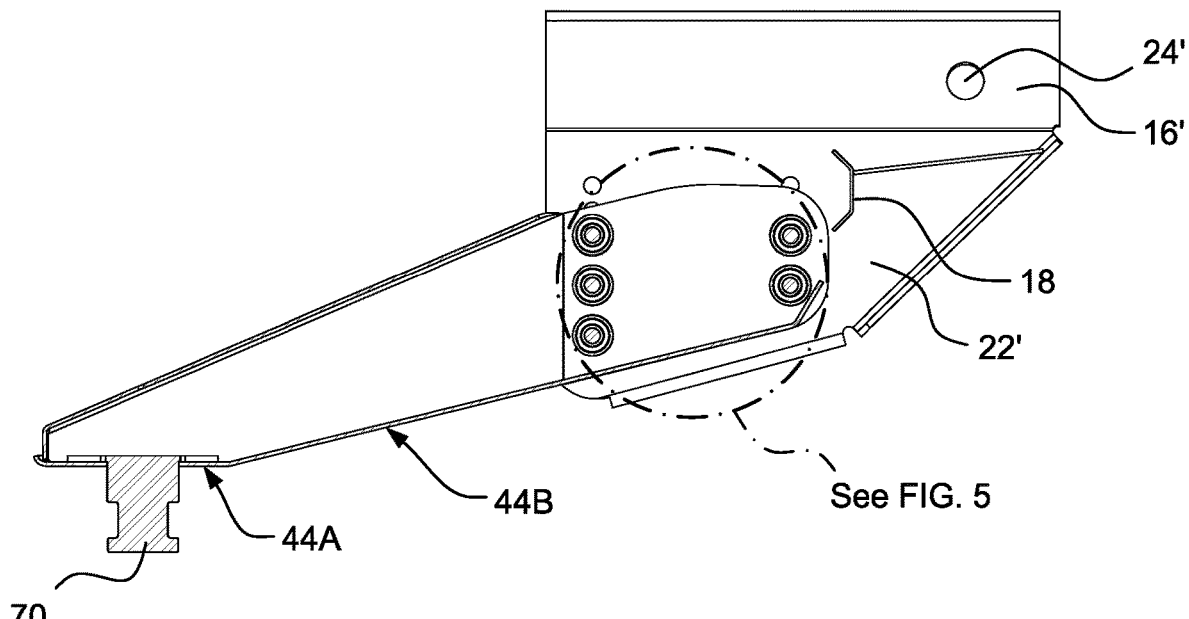
FIG. 4 is left side cross-sectional elevation view of the shock absorbing pin box of FIG. 1.

At least a first portion of the first side wall 36 is parallel to a corresponding first portion of the second side wall 38. As seen in FIG. 3, the first portion of the first side wall 36 is spaced from the first portion of the second side wall 38 by a first predetermined perpendicular distance D1. The first predetermined perpendicular distance D1 is sized so that the pin box 14 may be received within the interior space 20 defined by the mounting bracket 12 with the first side wall 36 of the pin box closely adjacent to or in abutment with the first wing plate 16 of the mounting bracket, with the second side wall of the pin box 38 closely adjacent to or in abutment with the second wing plate 16' of the mounting bracket, and such that the pin box may freely pivot with respect to the mounting bracket, as will be discussed further below.

The first portion of the first side wall 36 defines a first plurality of apertures 46 and a second plurality of apertures 48. The first plurality of apertures 46 is arranged in a first column, and the second plurality of apertures 48 is arranged in a second column parallel to the first column. Similarly, the first portion of the second side wall 38 defines a third plurality of apertures 50 and a fourth plurality of apertures 52. The third plurality of apertures 50 is arranged in a third column, and the fourth plurality of apertures 52 is arranged in a fourth column parallel to the third column. The apertures 24, 24' of the wing plates 16, 16' are arranged and spaced to correspond with the apertures 46, 48, 50, 52 of the first through fourth columns. Apertures 46 and 48 are spaced respectively from apertures 50 and 52 by approximately the first predetermined distance D1. It should be noted in other embodiments that apertures 48 and 52 could be spaced by a distance larger than first predetermined distance D1. In such an embodiment, the distance between apertures 48 and 52 would extend a taper in the pin box shape, as will be described in greater detail below.

As shown, the first side wall 36 and the second side wall 38 may each include a second portion extending from the first portion thereof to or toward the front panel 42. The second portion of the first side wall 36 is spaced from the second portion of the second side wall 38 by a second predetermined perpendicular distance D2. The second portion of the first side wall 36 tapers toward the second portion of the second side wall 38, and the second portion of the second side wall 38 tapers toward the second portion of the first side wall 36. Therefore, the second predetermined perpendicular distance D2 is substantially shorter than first predetermined perpendicular distance D1. In the embodiments shown, second distance D2 is approximately half of the length of first distance D1, but could be longer or shorter in other embodiments. The side profile of the second portion of the respective side walls 36, 38 are also tapered to reduce material and weight of the pin box while providing sufficient stability.

The upper wall 40 includes a first (or rearward) panel 40A and a second (or forward) panel 40B. As shown, the first panel 40A is rectangular and connected to respective upper edges of the first panel of the first side wall 36 and the first panel of the second side wall 38. Also, as shown, the second panel 40B is trapezoidal and connected to respective upper edges of the second panel of the first sidewall 36, the second panel of the second sidewall 38, and the front wall 42. In embodiments wherein the first and second sidewalls 36, 38 are planar, the second panel of the upper wall 40 could be rectangular.

The bottom wall 44 includes a first (or rearward) panel 44A and a second (or forward) panel 44B. The first 44A panel is connected to respective rearward lower edges of the first and second sidewalls 36, 38. The second panel 44B is connected to respective forward lower edges of the first and second sidewalls 36, 38 and the front wall 42.

A kingpin 70 is connected to and extends downwardly from the second panel 44B of the bottom wall 44. The angle of the side walls 36, 38 may vary for sufficient connection between the kingpin 70 and the towed vehicle frame.

A first plurality of tubes 54 is connected between the first side wall 36 and the second side wall 38, for example, by welding. Each one of the first plurality of tubes 54 is coaxially aligned with corresponding first and third plurality of apertures 46, 50 of the pin box 14. A second plurality of tubes 56 is connected between the first side wall 36 and the second side wall 38, for example, by welding. Each one of the second plurality of tubes 56 is coaxially aligned with corresponding second and fourth plurality of apertures 48, 52 of the pin box.

Figure 5:
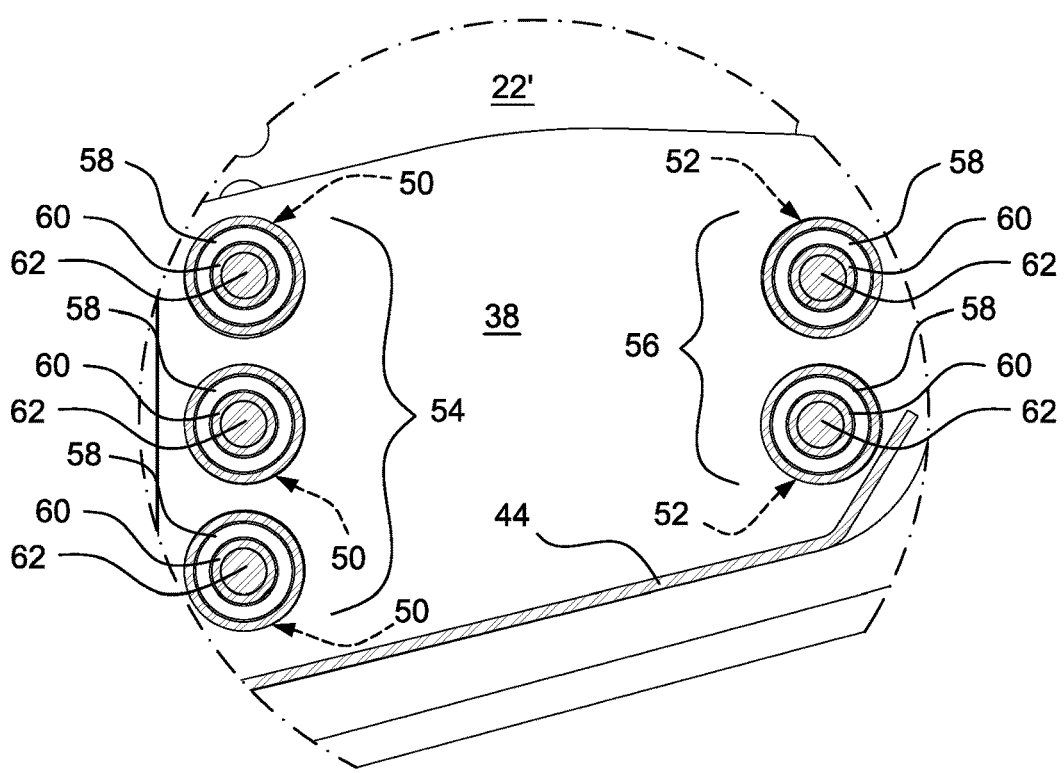
FIG. 5 is a detail left side cross-sectional view of the shock absorbing pin box of FIG. 1.
Figure 6:
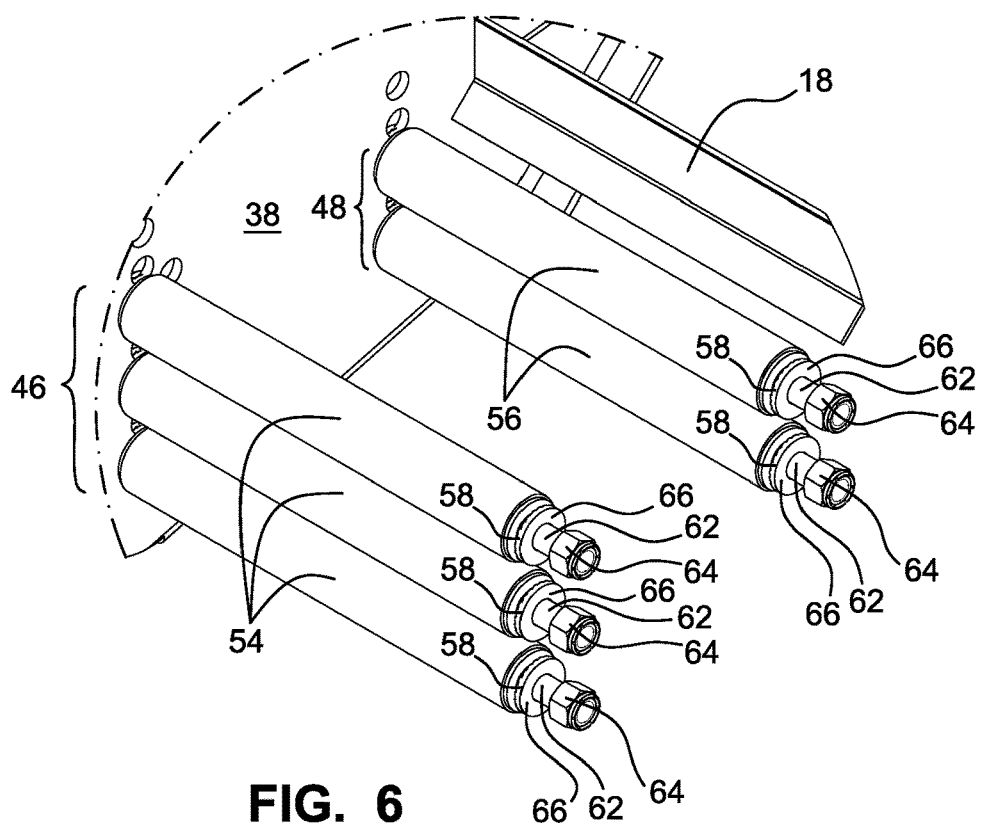
FIG. 6 is an internal perspective view of the shock absorbing pin box of FIG. 1.
Figure 7:
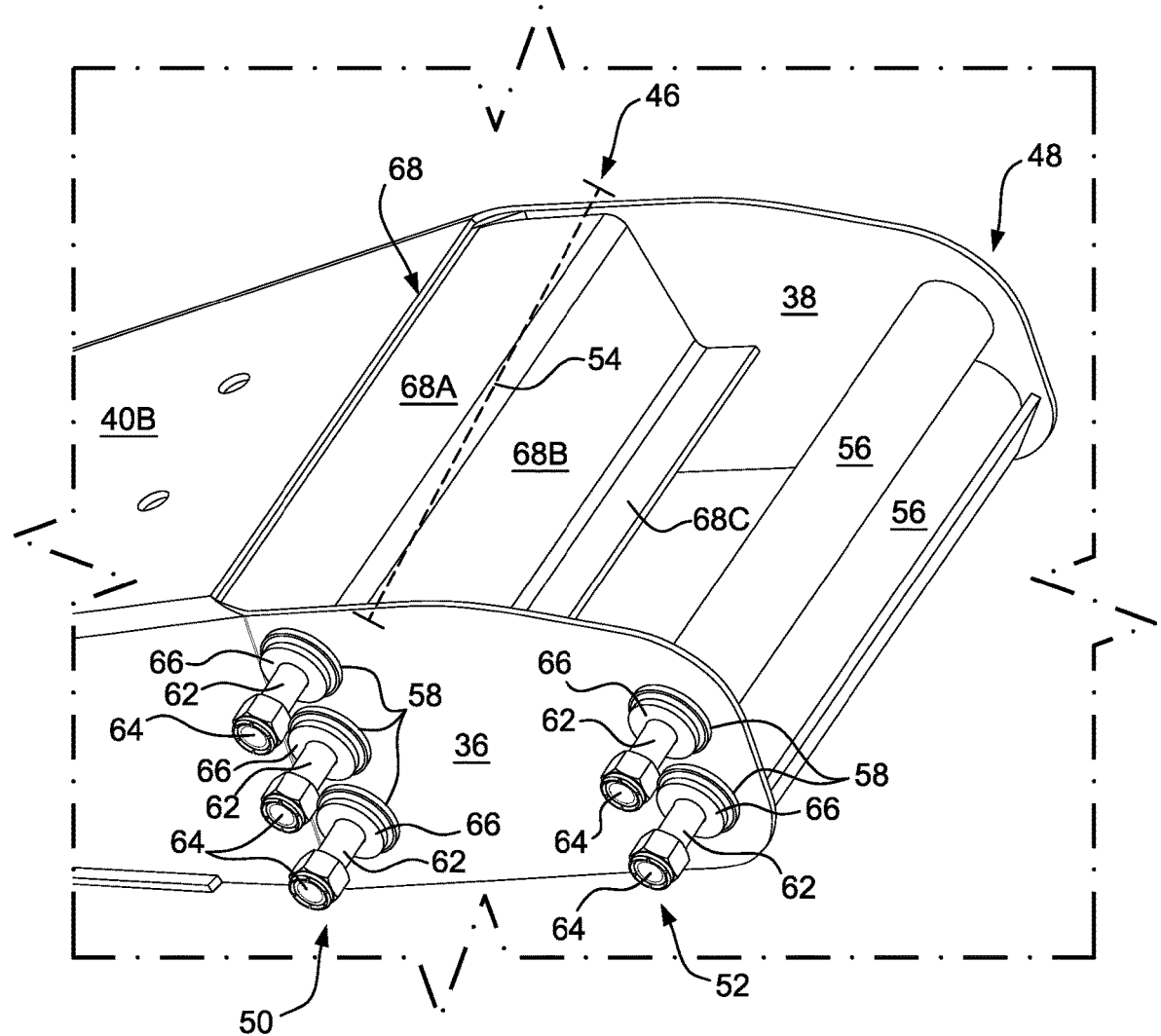
FIG. 7 is a partially exploded perspective rear view of the shock absorbing pin box of FIG. 1 with a rear support bracket.
Figure 8:
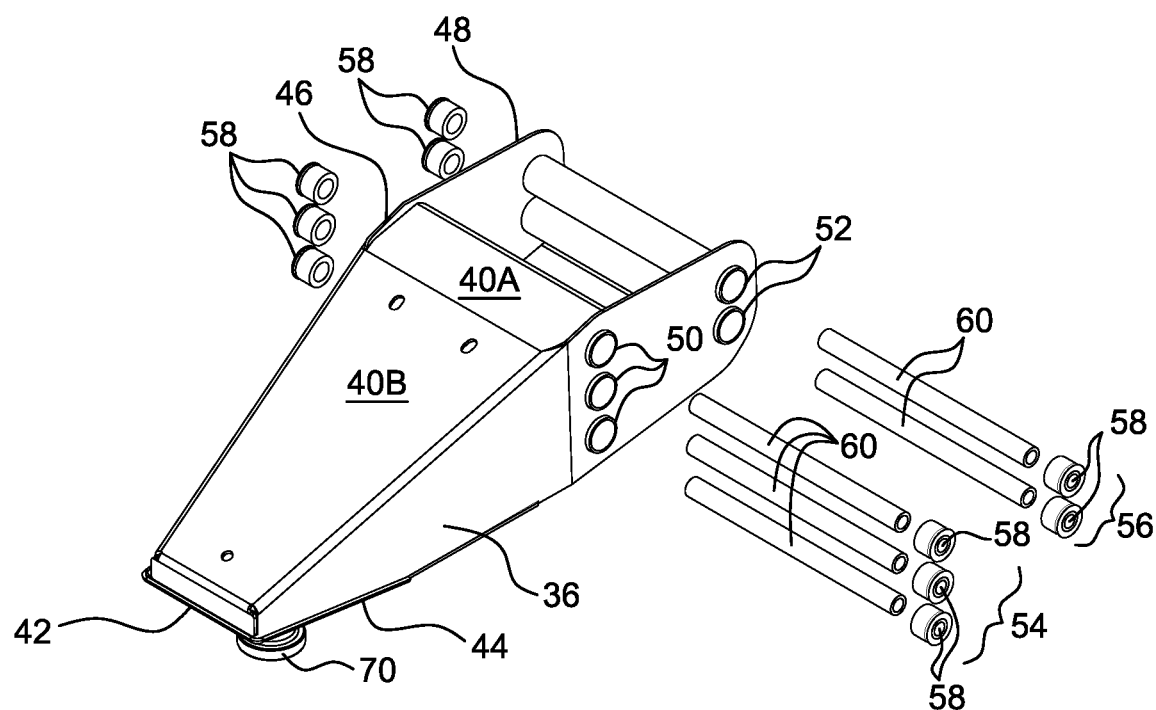
FIG. 8 is a perspective partially exploded view of the shock absorbing pin box of FIG. 1.
Figure 9:
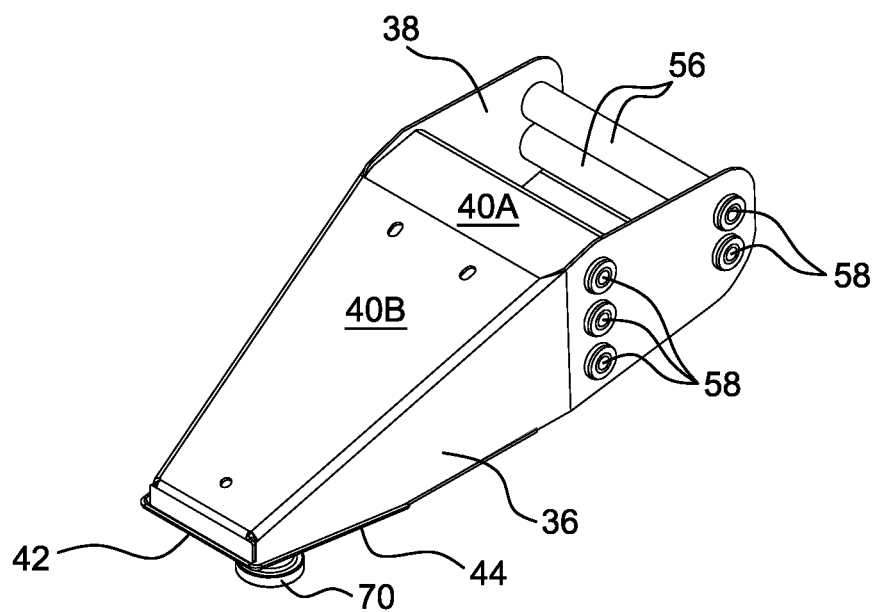
FIG. 9 is a perspective view of the shock absorbing pin box of FIG. 1.
Figure 10:
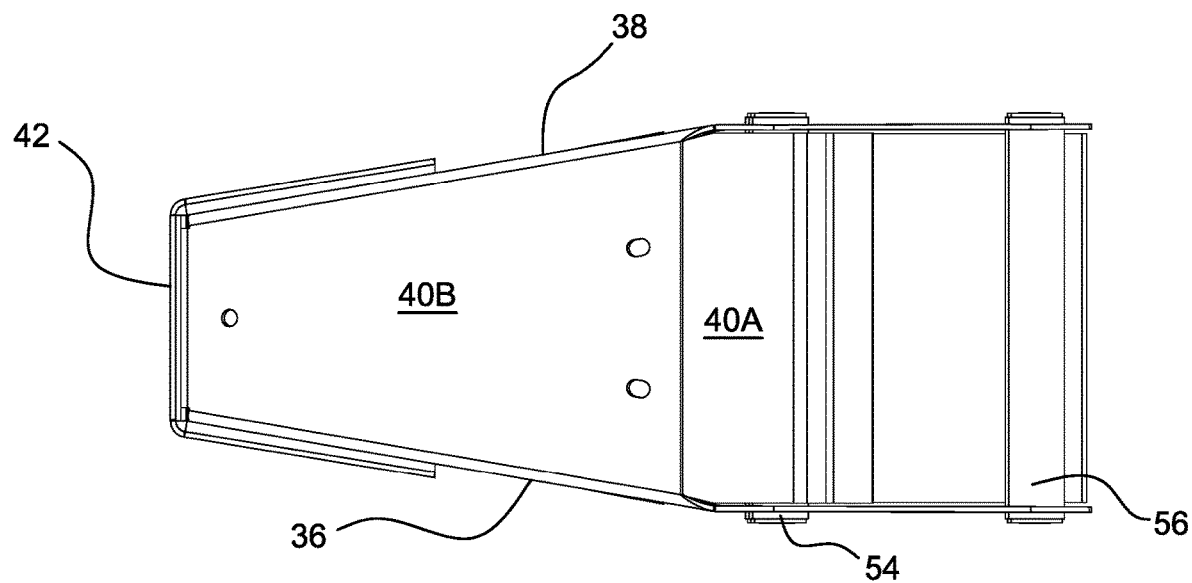
FIG. 10 is a top perspective view of the shock absorbing pin box of FIG. 1.
Figure 11:
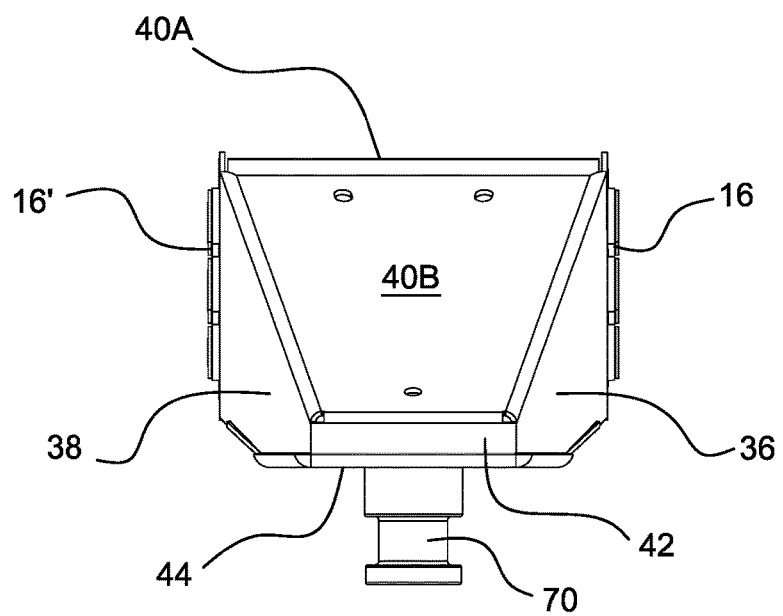
FIG. 11 is a front perspective view of the shock absorbing pin box of FIG. 1.
Figure 12:
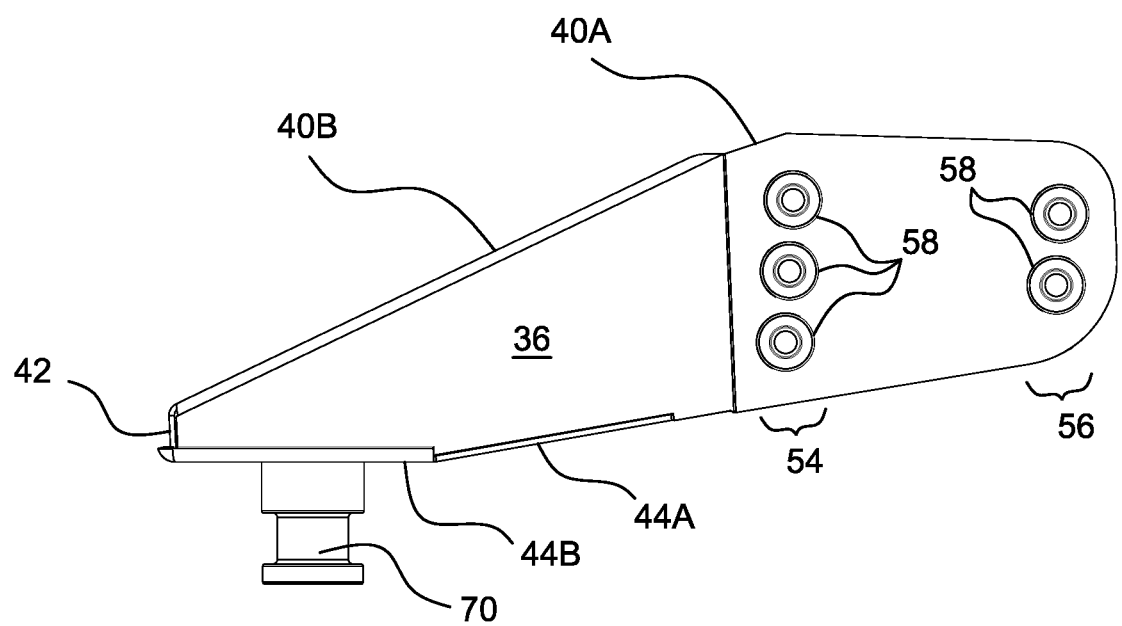
FIG. 12 is a left side perspective view of the shock absorbing pin box of FIG. 1.
Figure 13A:
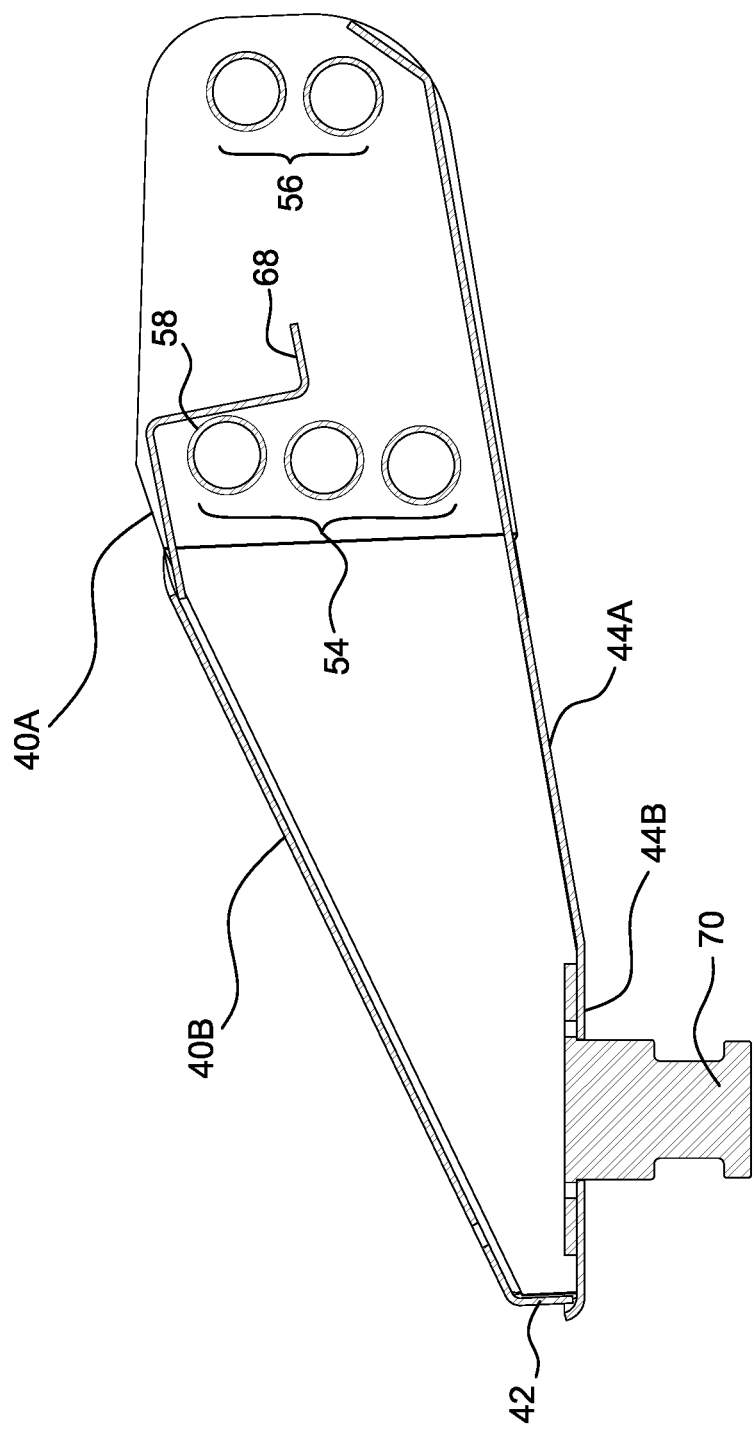
FIG. 13a is a left side cross-sectional view of the pin box frame according to the present disclosure.
Figure 13B:
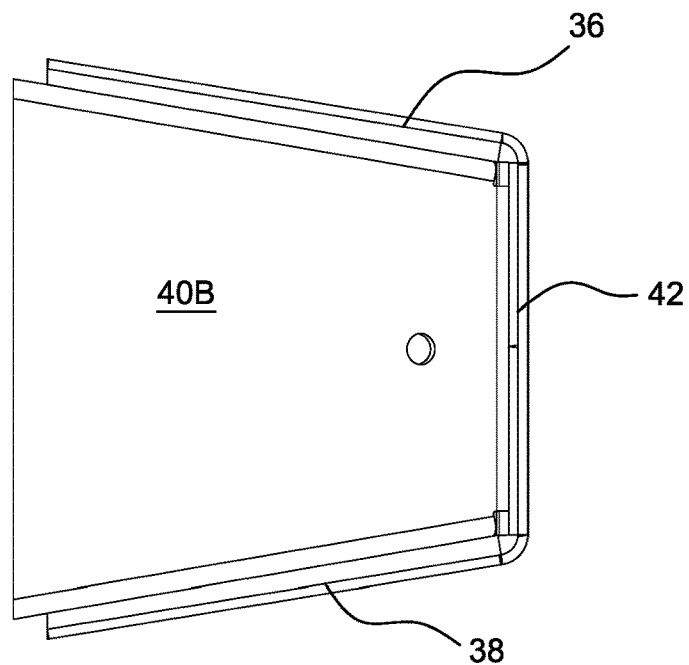
Figure 13C:
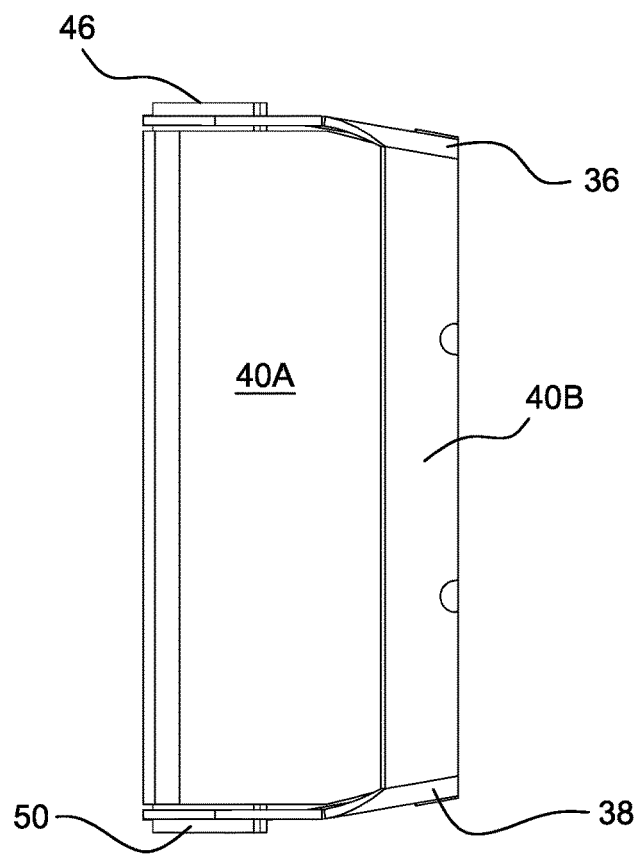
Figure 13D:
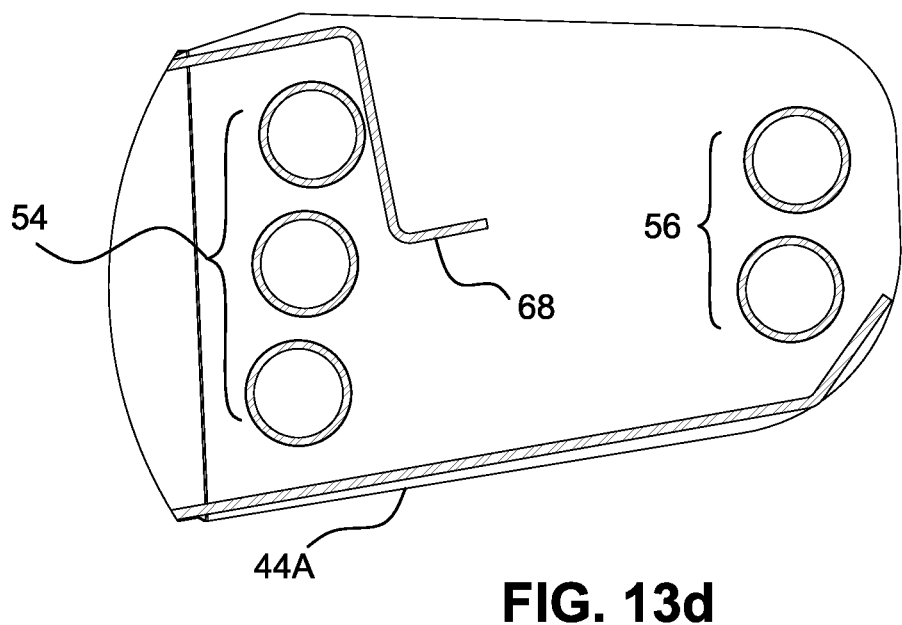
Figure 13E:
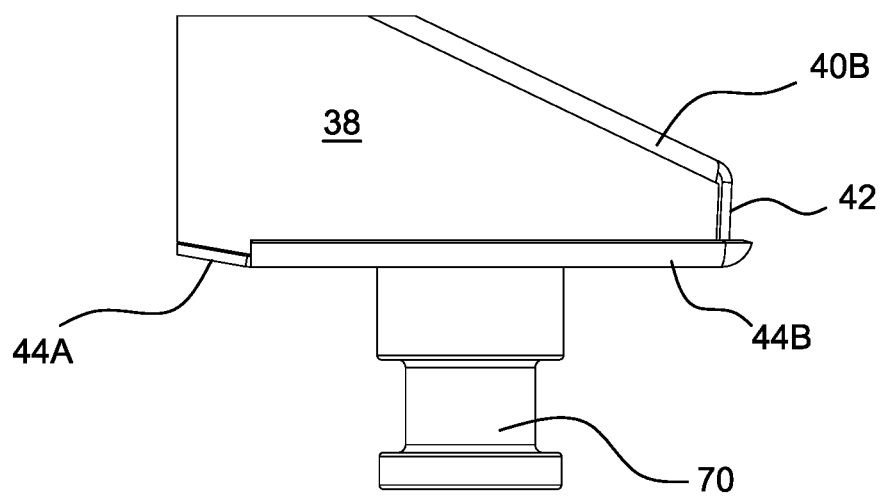
Figure 14:
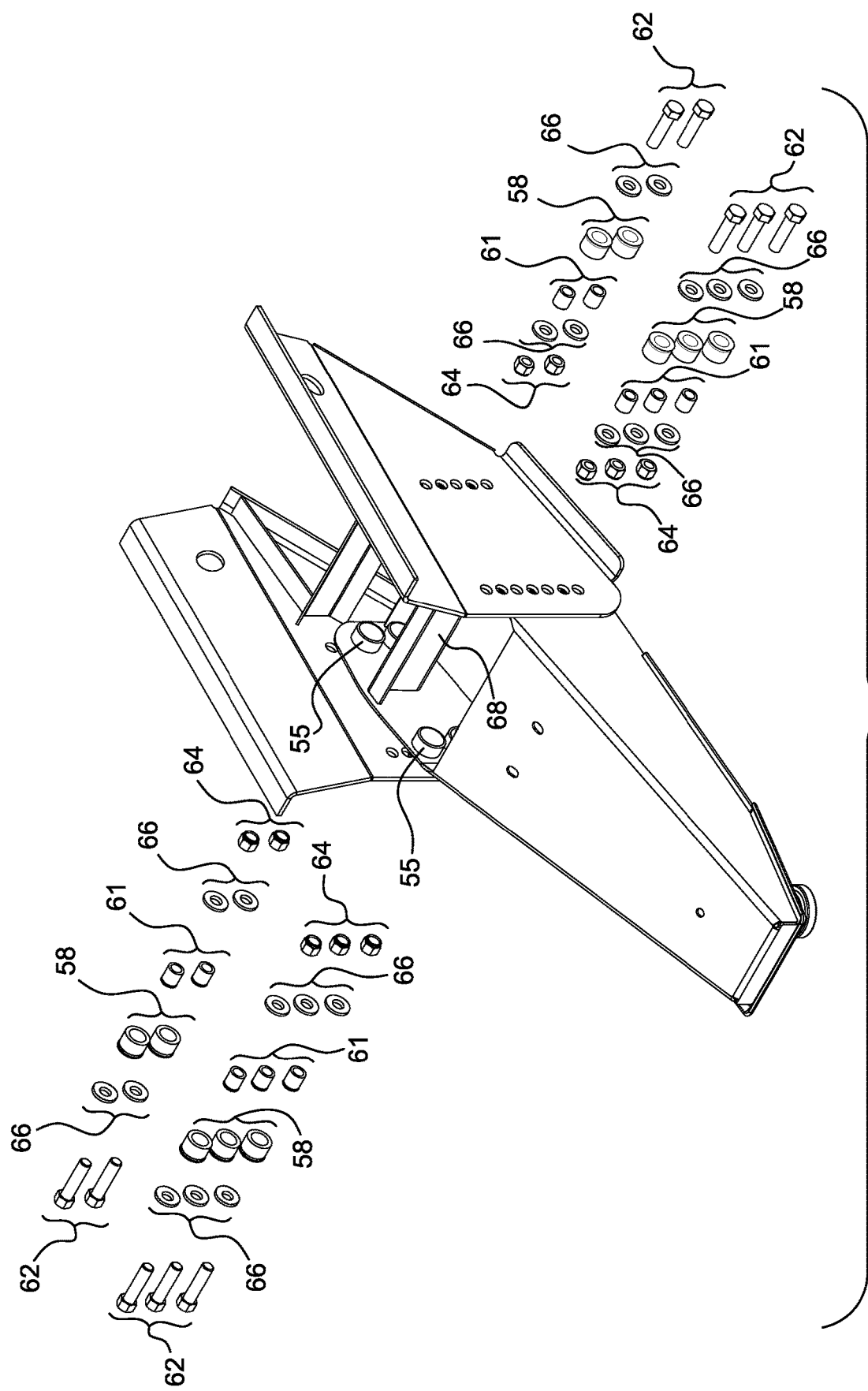
FIG. 14 is a perspective partially exploded view of an alternate embodiment of the shock absorbing pin box.
Figure 15:
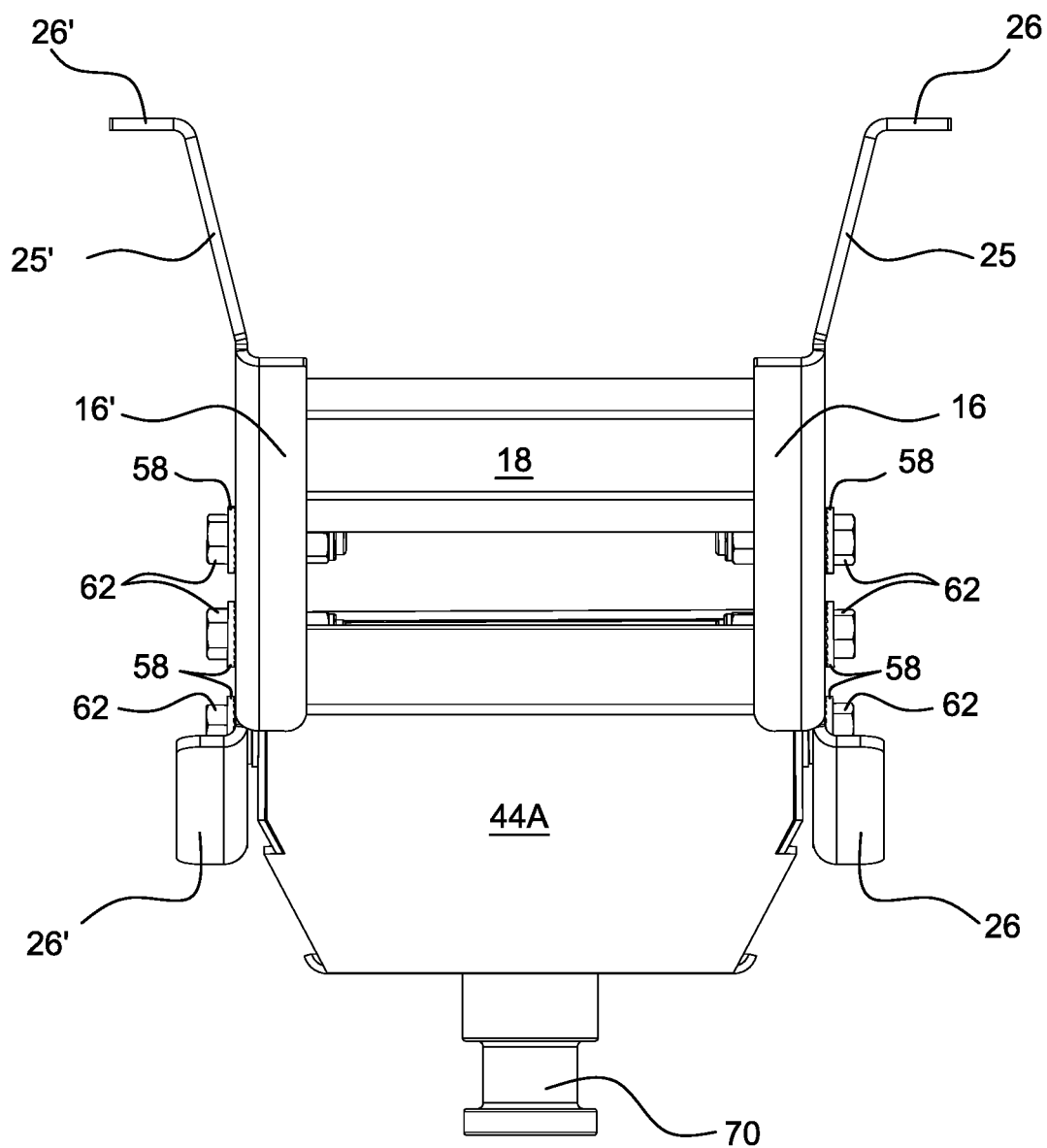
FIG. 15 is a rear perspective view of the shock absorbing pin box of FIG. 14.
Figure 16:
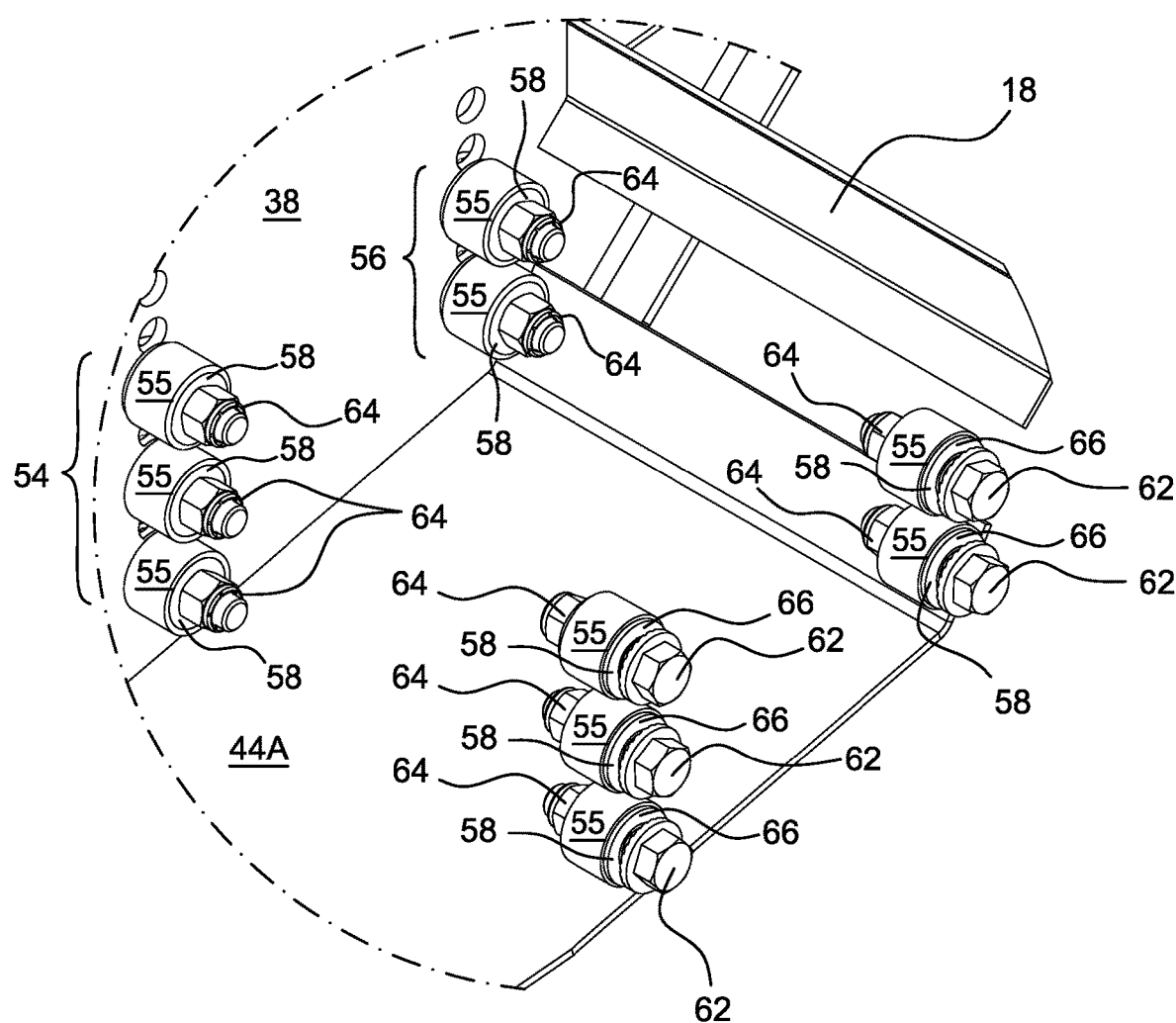
FIG. 16 is an internal perspective view of the shock absorbing pin box of FIG. 14.
Figure 17:
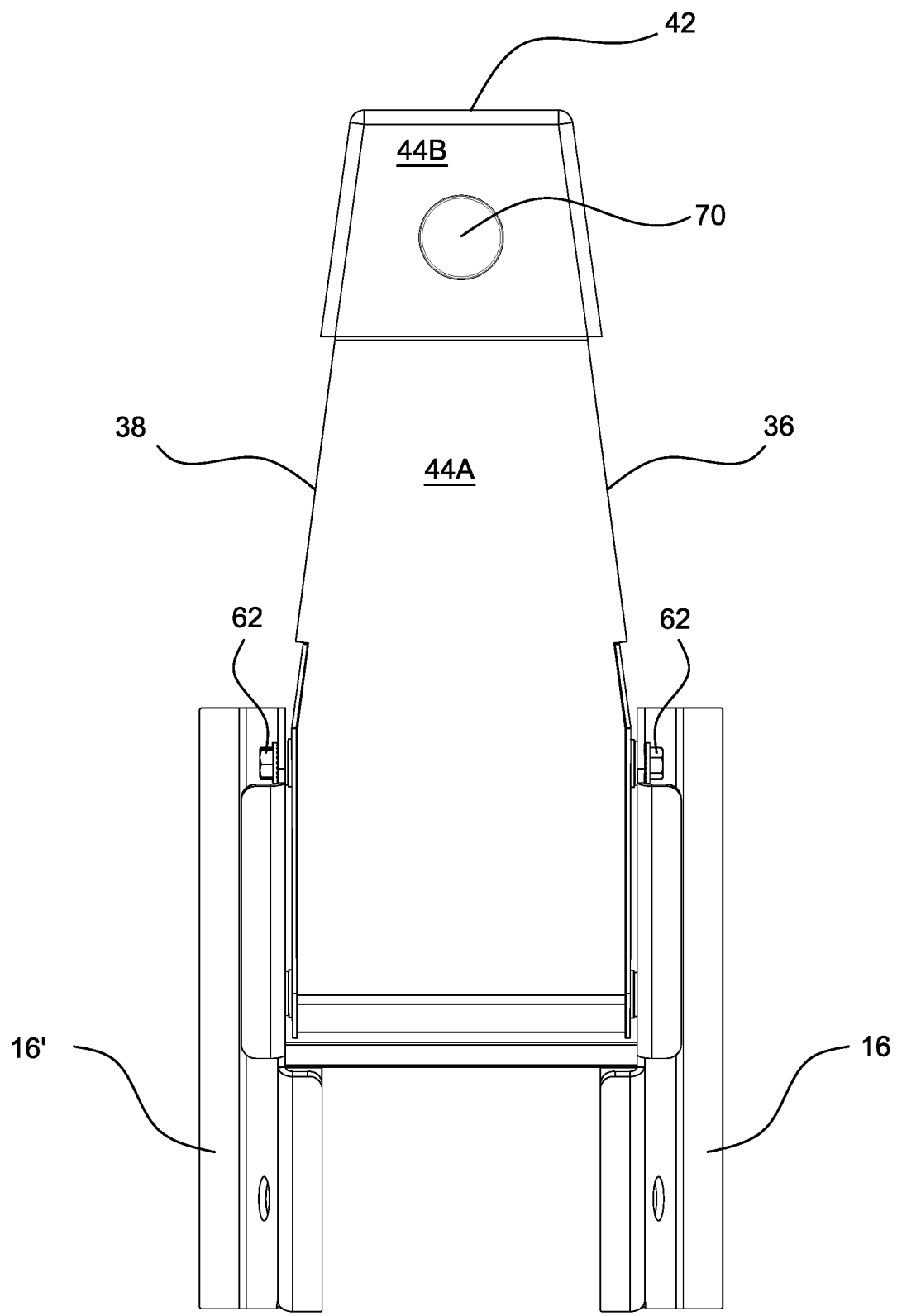
FIG. 17 is a bottom perspective view of the shock absorbing pin box of FIG. 14.
Figure 18:
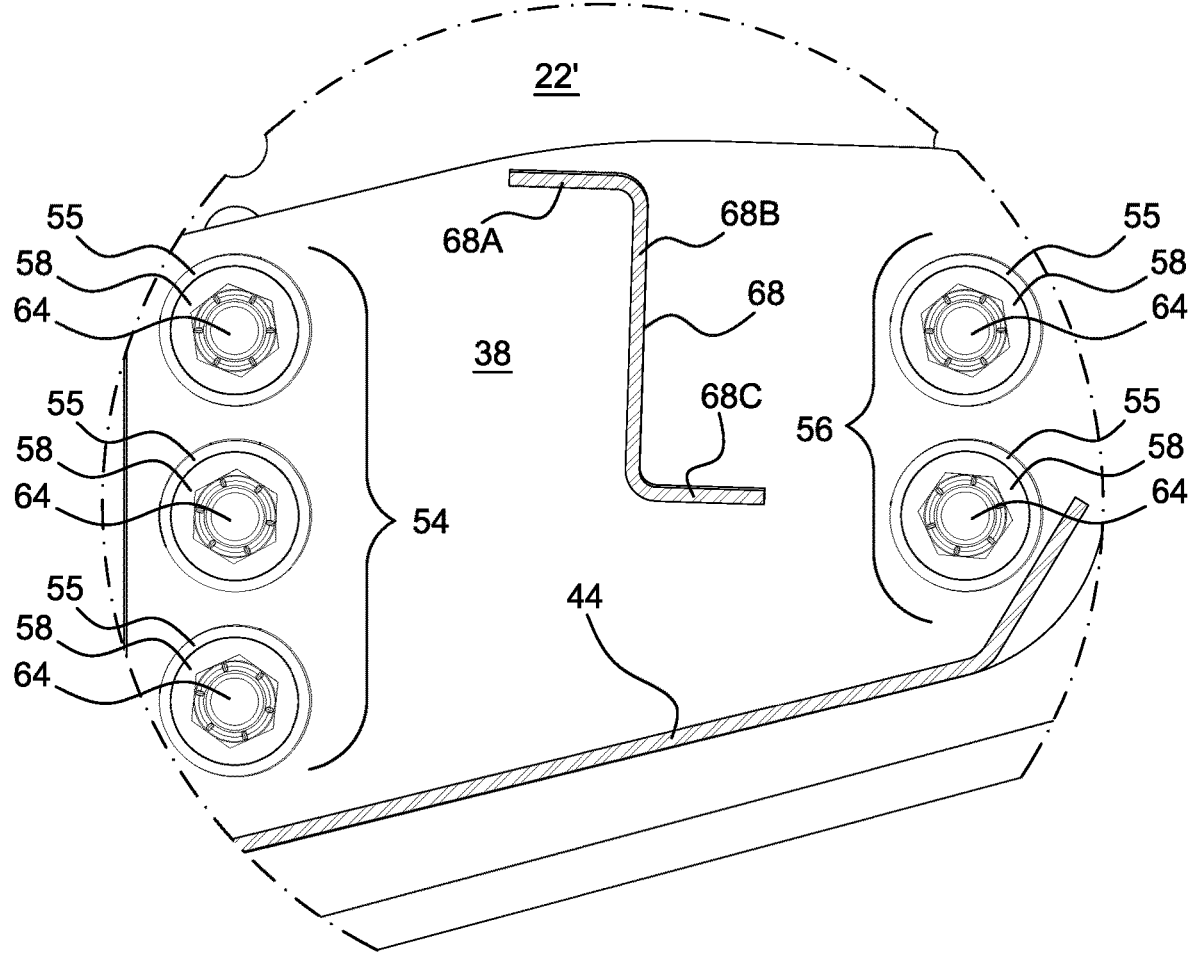
FIG. 18 is a detail left side cross-sectional view of the shock absorbing pin box of FIG. 14.

As seen in FIGS. 6-7, a respective flexible and resilient tubular bushing 58 is received within each end of each tube of the first and second pluralities of tubes 54, 56. The length of the resilient tubular bushings 58 may vary, but the bushings are about a quarter of the length of the tube 54 or 56 or less in the embodiments shown. The flexible and resilient tubular bushings 58 may be made of, for example, polyurethane between a durometer of 75A-95A. Other suitable shock-absorbing materials and durometers could be used. As seen in FIG. 5, a bushing tube 60 is received within each of the flexible and resilient tubular bushings 58.

In another embodiment seen in FIGS. 14-18, shortened tubes 55 extending between the side walls 36 and 38 could be discontinuous and extend a substantially shorter distance into the interior of the pin box than the distance between the side walls D1. Shortened tubes 55 are open-ended on both sides of their corresponding side wall 36 or 38. A resilient tubular bushing 58 is received within each shortened tube 55. A shortened bushing tube 61 is received within each of the flexible and resilient tubular bushings 58.

The pin box 14 may be assembled to the mounting bracket 12 by positioning the pin box within the interior space 20 defined by the mounting bracket so that ones of the first plurality of apertures 46 of the pin box are coaxially aligned with corresponding ones of a first plurality of apertures 30 of the mounting bracket, and so that ones of the second plurality of apertures 48 of the pin box are coaxially aligned with corresponding ones of a second plurality of apertures 32 of the mounting bracket. Bolts 62 may be inserted through corresponding ones of the forgoing pluralities of apertures and secured with nuts 64. Washers 66 may be disposed between heads of the bolts 62 and/or the nuts 64 and corresponding bearing surfaces of the wing plates 16, 16'. As seen in the figures, embodiments with pluralities of tubes 54 and 56 will generally receive a bolt 62 within an aperture of one of the first or second side wall, and then will receive a nut 64 within an aperture of the other of the first or second side wall. In embodiments with shortened tubes 55, a bolt 62 and a nut 64 will correspond to each aperture of both the first and second side walls, substantially flanking either side of the respective side wall 36 or 38.

The pin box 14 may also have a rear support bracket 68 mounted between the side walls 36, 38 and substantially disposed between the plurality of tubes 54, 56. The rear support bracket 68 may be Z-shaped with an upper horizontal plate 68A, a substantially vertical plate 68B, and a lower horizontal plate 68C. In the embodiments shown, the upper horizontal plate 68A is welded or otherwise connected between the side walls 36, 38 at a position above the first plurality of tubes 54. Subsequently, the vertical plate 68B and the lower horizontal plate 68C are disposed between the plurality of tubes 54, 56 without interfering with any other components mounted between the side walls 36, 38. In other embodiments, the rear support bracket 68 may be disposed completely between the plurality of tubes 54, 56. It should be understood that the rear support bracket may also be used in the pin box embodiment with shortened tubes 55. The rear support bracket 68 provides support to and strengthens the pin box 14 while in use and prevents shearing between components of the pin box. In other embodiments, the rear support bracket could consist of fewer plates, take on a different overall shape, or could be eliminated.

Each of the first, second, third, and fourth pluralities 30, 32, 30', 32' of apertures defined by the first and second wing plates 16, 16' may define more apertures than the corresponding ones of the first, second, third, and fourth pluralities of apertures 46, 48, 50, 52 defined by the first and second sidewalls of the pin box 14. This feature enables the pin box 14 to be assembled to the mounting bracket 12 in several configurations, each yielding a different distance between the kingpin 70 and the first flanges of the wing plates 16, 16'.

In use, the mounting bracket 12 may be connected to a frame of a trailer, for example, by welding. The kingpin 70 may be connected to a fifth wheel hitch of a tow vehicle. Loads imparted by one of the tow vehicle (through the pin box 14) and the trailer (through the mounting bracket 12) to the other of the tow vehicle and trailer may be transferred from the one of the tow vehicle and the trailer to the other of the tow vehicle and the trailer through the first and second pluralities of tubes 54, 56 or shortened tubes 55, corresponding flexible and resilient tubular bushings 58, the bushing tubes 60, and the bolts 62. Such load transfer may result in radial compression of the flexible and resilient tubular bushings 58. Release of the loads may result in radial decompression of the flexible and resilient tubular bushings 58. Such compression and decompression of the flexible and resilient tubular bushings 58 may be effective to absorb and/or dampen shock loads imparted by the tow vehicle to the trailer and vice versa in the longitudinal direction, the vertical direction, and any direction therebetween.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A shock absorbing pin box system comprising:
    a pin box comprising:
        a first sidewall;
        a second sidewall;
        an upper wall;
        the first sidewall of the pin box defining a first plurality of pin box apertures and a second plurality of pin box apertures;
        the second sidewall of the pin box defining a third plurality of pin box apertures and a fourth plurality of pin box apertures;
        a first plurality of tubes connected between corresponding ones of the first plurality of pin box apertures and the third plurality of pin box apertures;
        a second plurality of tubes connected between corresponding ones of the second plurality of pin box apertures and the fourth plurality of pin box apertures;
        a plurality of flexible and resilient tubular bushings, each of the first and second plurality of tubes receiving at least one flexible and resilient tubular bushing; and
    a plurality of bolts, wherein ones of the plurality of bolts are received within corresponding ones of the first, second, third, and fourth pluralities of pin box apertures, and corresponding ones of the first and second pluralities of tubes.

2. The shock absorbing pin box system of claim 1 further comprising:
    a mounting bracket comprising:
        a first wing plate; and
        a second wing plate;
        the first wing plate defining a first plurality of wing plate apertures and a second plurality of wing plate apertures; and
        the second wing plate defining a third plurality of wing plate apertures and a fourth plurality of wing plate apertures.

3. The shock absorbing pin box system of claim 2 further comprising a cross member connecting the first wing plate to the second wing plate so that at least a portion of the first wing plate is parallel to at least a portion of the second wing plate.

4. The shock absorbing pin box system of claim 2 wherein the first and second sidewalls are received between the first and second wing plates with ones of the first, second, third, and fourth pluralities of pin box apertures coaxially aligned with corresponding ones of the first, second, third, and fourth pluralities of wing plate apertures.

5. The shock absorbing pin box system of claim 4 wherein the plurality of bolts are received within corresponding ones of the first, second, third, and fourth pluralities of wing plate apertures, corresponding ones of the first, second, third, and fourth pluralities of pin box apertures, and corresponding ones of the first and second pluralities of tubes.

6. The shock absorbing pin box system of claim 1 wherein the first plurality of pin box apertures are separated from the third plurality of pin box apertures by a first predetermined distance.

7. The shock absorbing pin box system of claim 6 wherein the second plurality of pin box apertures are separated from the fourth plurality of pin box apertures by a second predetermined distance.

8. The shock absorbing pin box system of claim 7 wherein the second predetermined distance is equal to the first predetermined distance.

9. The shock absorbing pin box system of claim 1 further comprising a rear support bracket mounted substantially between the first and second plurality of tubes.

10. The shock absorbing pin box system of claim 1 wherein the first, second, third, and fourth pluralities of pin box apertures each receive a flexible and resilient tubular bushing.

11. The shock absorbing pin box system of claim 1 wherein the first, second, third and fourth pluralities of pin box apertures are each respectively arranged in a column.

12. A shock absorbing pin box system comprising:
  a pin box comprising:
    a first sidewall;
    a second sidewall;
    an upper wall;
    the upper wall connecting the first sidewall to the second sidewall; and
    the first sidewall of the pin box defining a first plurality of pin box apertures;
    the second sidewall of the pin box defining a second plurality of pin box apertures;
    a first plurality of tubes extending from the first plurality of pin box apertures;
    a second plurality of tubes extending from the second plurality of pin box apertures;
    a plurality of flexible and resilient tubular bushings, each of the first and second plurality of tubes receiving at least one flexible and resilient tubular bushing; and
  a plurality of bolts, wherein ones of the plurality of bolts are received within corresponding ones of the first and second pluralities of pin box apertures, and corresponding ones of the first and second pluralities of tubes.

13. The shock absorbing pin box system of claim 12 further comprising a plurality of nuts received on corresponding ones of the plurality of bolts.

14. The shock absorbing pin box system of claim 12 further comprising:
  the first sidewall of the pin box defining a third plurality of pin box apertures;
  the second sidewall of the pin box defining a fourth plurality of pin box apertures;
  a third plurality of tubes extending from the third plurality of pin box apertures;
  a fourth plurality of tubes extending from the fourth plurality of pin box apertures;
  wherein each of the third and fourth plurality of tubes receiving at least one flexible and resilient tubular bushing; and
  wherein ones of the plurality of bolts are received within corresponding ones of the third and fourth pluralities of pin box apertures, and corresponding ones of the third and fourth pluralities of tubes.

15. The shock absorbing pin box system of claim 14 further comprising a plurality of nuts received on corresponding ones of the plurality of bolts.

16. A shock absorbing pin box system comprising:
  a pin box including side walls with a plurality of pin box apertures;
  a plurality of tubes connected between the side walls in alignment with the pin box apertures;
  a pair of wing plates including a plurality of wing plate apertures;
  a plurality of flexible and resilient tubular bushings positioned in the plurality of tubes through the pin box apertures and the wing plate apertures;
  a plurality of bushing tubes positioned in the tubular bushings and through the pin box apertures and the wing plate apertures; and
  a plurality of bolts positioned in the tubular bushings and through the pin box apertures and the wing plate apertures.

17. The shock absorbing pin box system of claim 16, wherein the pluralities of tubes, tubular bushings, bushing tubes and bolts are arranged concentrically with the bolts innermost, the bushing tubes radially outward of the bolts, the tubular bushings radially outward of the bushing tubes, and the tubes radially outward of the tubular bushings.

* * * * *